(12) United States Patent
Hsu

(10) Patent No.: US 8,220,367 B2
(45) Date of Patent: Jul. 17, 2012

(54) TRANSMISSION EXTENSION ADAPTER FOR POWER HAND TOOL

(75) Inventor: Ming-Hung Hsu, Taichung (TW)

(73) Assignee: Mobiletron Electronics Co., Ltd., Taichung Hsien (TW)

( * ) Notice: Subject to any disclaimer, the term of this patent is extended or adjusted under 35 U.S.C. 154(b) by 1079 days.

(21) Appl. No.: 12/132,351

(22) Filed: Jun. 3, 2008

(65) Prior Publication Data
US 2009/0194954 A1    Aug. 6, 2009

(30) Foreign Application Priority Data
Feb. 1, 2008    (TW) ................................ 97104039 A

(51) Int. Cl.
B25B 23/04    (2006.01)
B25B 23/06    (2006.01)
B25B 23/00    (2006.01)
B23B 31/02    (2006.01)
B23B 31/06    (2006.01)

(52) U.S. Cl. ............ 81/434; 81/57.37; 81/184; 279/144

(58) Field of Classification Search .................... 81/434, 81/57.37, 177.2, 184; 279/144, 145
See application file for complete search history.

(56) References Cited

U.S. PATENT DOCUMENTS
7,134,367 B2 * 11/2006 Gehring et al. ................. 81/434
* cited by examiner

*Primary Examiner* — Bryan R Muller
(74) *Attorney, Agent, or Firm* — Browdy and Neimark, PLLC

(57) ABSTRACT

A transmission extension adapter for connection between a work head and the chuck of a power hand tool includes a cylindrical cap shell coupled to the power hand tool around the chuck and having radial through holes and a positioning member in each radial through hole. An axle sleeve is rotatably coupled to the cylindrical cap shell and has locating holes on the periphery thereof. A transmission axle is inserted through the axle sleeve and has a rear end connected to the chuck and a front end connected with a supplementary chuck for holding the work head. A front cap assembly is affixed to the front end of the axle sleeve to hold an automatic feeder for allowing rotation of the automatic feeder with the axle sleeve. A multi-angle positioning device is adapted for holding down the positioning members in the locating holes to lock the axle sleeve.

17 Claims, 15 Drawing Sheets

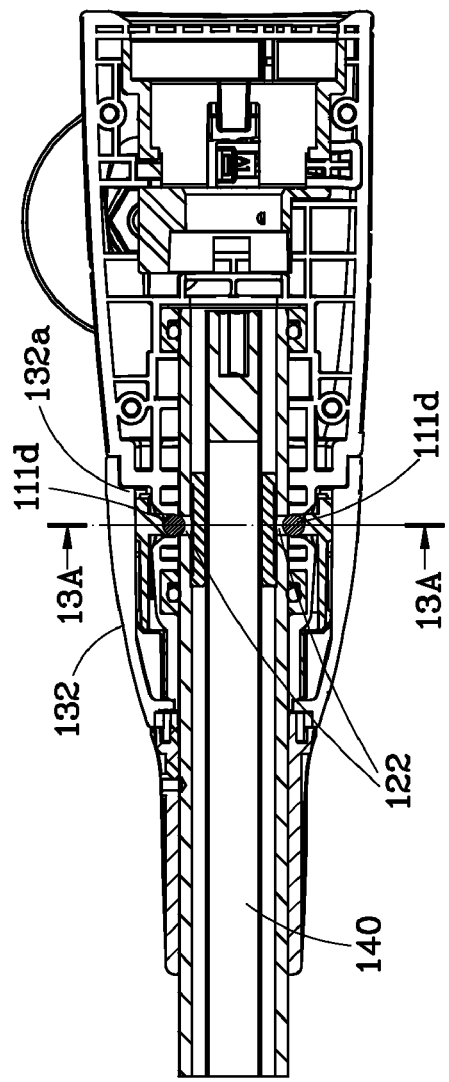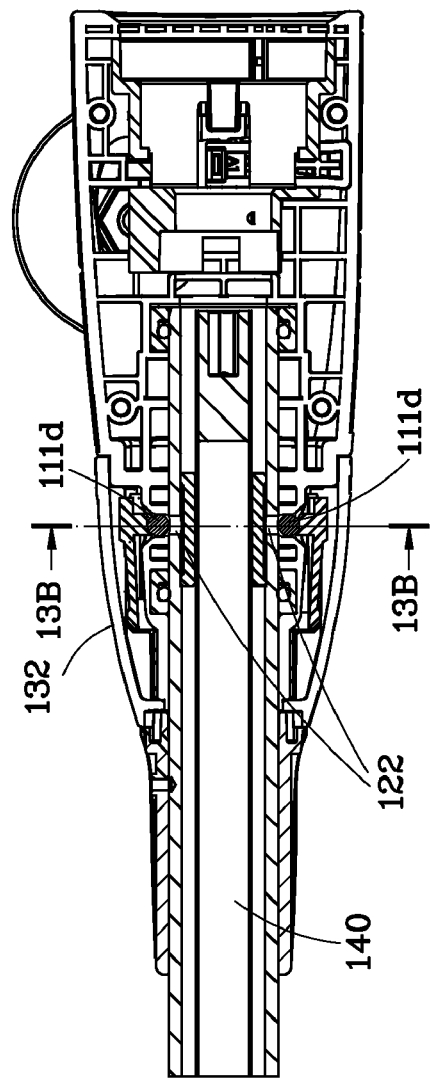

TRANSMISSION EXTENSION ADAPTER FOR POWER HAND TOOL

BACKGROUND OF THE INVENTION

1. Field of the Invention

The present invention relates generally to power hand tools and more particularly, to a transmission extension adapter for use with a power hand tool for extending the length of the power hand tool and allowing adjustment of the angle in axial direction.

2. Description of the Related Art

Power hand tools are adapted for rotating a work head, such as screwdriver tip or augur tip, for working. A power hand tool usually uses a motor or air turbine to provide a rotary driving force and a transmission gear set to lower the revolving speed of the rotary driving force and to amplify the torque, thereby driving a chuck to rotate. The work head is secured to and rotated with the chuck. When compared with a manual hand tool, a power hand tool provides a high speed rotation and a high torque output, improving the working efficiency. Further, when torque control is necessary, for example, when a specific torque is required for driving a screwdriver tip to fasten a screw, the output value of a power hand tool can be set by means of limiting the output power and revolving speed.

To improve the working efficiency, an operator may use a power screwdriver to fasten screws at selected locations. Many automatic screw feeders are known for feeding screws and temporarily hold each fed screw to the front end of the screwdriver tip. A known prior art discloses an automatic feeder and a chain belt for quick connection to the front side of a screwdriver. Screws are held on the chain belt. The automatic feeder can carry the chain belt to shift one screw to the front side of the screwdriver tip. By means of moving the screwdriver tip relative to the front side of the automatic feeder, the screwdriver tip touches the screw and pushes the screw away from the chain belt toward the workpiece for fastening.

To facilitate holding, a power hand tool is generally made in the shape of a pistol and provided with a grip for holding by the user. A user usually holds a power hand tool subject to one's habit, assuring high stability. When a user is working in a wide working area, he or she can maintain the preferred working posture. However, when a user is working in a narrow working area, for example, when it is necessary to insert the screwdriver tip into a narrow gap, the working direction of the power hand tool may have to be adjusted so that the screwdriver tip can reach the work point. Under this condition, the user may be unable to keep the preferred working posture, lowering the working efficiency. When the work point is at the deep inside of a narrow gap, the user may be unable to approach the screwdriver tip of the power hand tool to the work point to fasten a screw. Under this condition, the user may have to use a low efficiency manual screwdriver to fasten the screw. If the user has to operate the manual screwdriver in a crouched posture for long time, the user will get tired soon and, the working efficiency will be lowered.

SUMMARY OF THE INVENTION

The present invention has been accomplished under the circumstances in view. It is the main objective of the present invention to provide a transmission extension adapter for power hand tool, which greatly extends the working distance of the power hand tool.

It is another objective of the present invention to provide a transmission extension adapter for power hand tool, which allows insertion of an automatic screw feeder into a deep narrow gap, allowing convenient use of the power hand tool in a narrow working space.

To achieve these objectives of the present invention, a transmission extension adapter is provided for connecting a work head to a chuck of a power hand tool for allowing rotation of the work head with the chuck by the power hand tool. The transmission extension adapter comprises a cylindrical cap shell for connection to the power hand tool to accommodate the chuck, an axle sleeve, a transmission axle, a multi-angle positioning device, a front cap assembly and a supplementary chuck. The cylindrical cap shell comprises a plurality of through holes and a positioning member accommodated in each through hole. The axle sleeve has one end thereof rotatably connected to the cylindrical cap shell and at least one locating hole at a periphery thereof for receiving at least one of the positioning members. The transmission axle is inserted through the axle sleeve and provided with one end connected to the chuck of the power hand tool. The multi-angle positioning device is adapted for locking the axle sleeve to the cylindrical cap shell. The front cap assembly is fastened to an opposite end of the axle sleeve opposite to the cylindrical cap shell. The supplementary chuck is received inside the front cap assembly and connected to an opposite end of the transmission axle opposite to the chuck of the power hand tool for chucking the work head. The multi-angle positioning device comprises a locating ring sleeved onto the cylindrical cap shell, and a collar sleeved onto and rotatable relative to the locating ring. The locating ring comprises a plurality of axially extending suspension arms, each of which has a holding down block. The holding down blocks of the suspension arms are respectively inserted into the through holes of the cylindrical cap shell and elastically and respectively press on the positioning members. The collar comprises a plurality of pressure members movable with rotary motion of the collar relative to the locating ring between a locking position where the pressure members press on the holding down blocks of the suspension arms against the positioning members and an unlocking position where the pressure members are released from the holding down blocks of the suspension arms.

As a result, the automatic feeder can be rotated about a longitudinal axis thereof along with the rotary motion of the axle sleeve. By means of the transmission extension adapter of the present invention, the working distance between the work head and the power hand tool can be extended. In addition, the axle sleeve can be locked in position after its rotation of a certain angle relative to the cylindrical cap shell, which in turn changes the angle of the automatic feeder relative to the power hand tool, such that the automatic feeder that has been rotated about its longitudinal axis with a certain angle may enter a narrow working space in a condition of that the user needs not to change the power hand tool 200 holding posture.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWING

The present invention will become more fully understood from the detailed description given herein below and the accompanying drawings which are given by way of illustration only, and thus are not limitative of the present invention, and wherein:

FIG. 12A is a longitudinal sectional view of a part of the transmission extension adapter in accordance with the preferred embodiment of the present invention, showing the axle sleeve locked;

FIG. 12B is similar to FIG. 12A, but showing the axle sleeve unlocked;

DETAILED DESCRIPTION OF THE INVENTION

Figure 1:
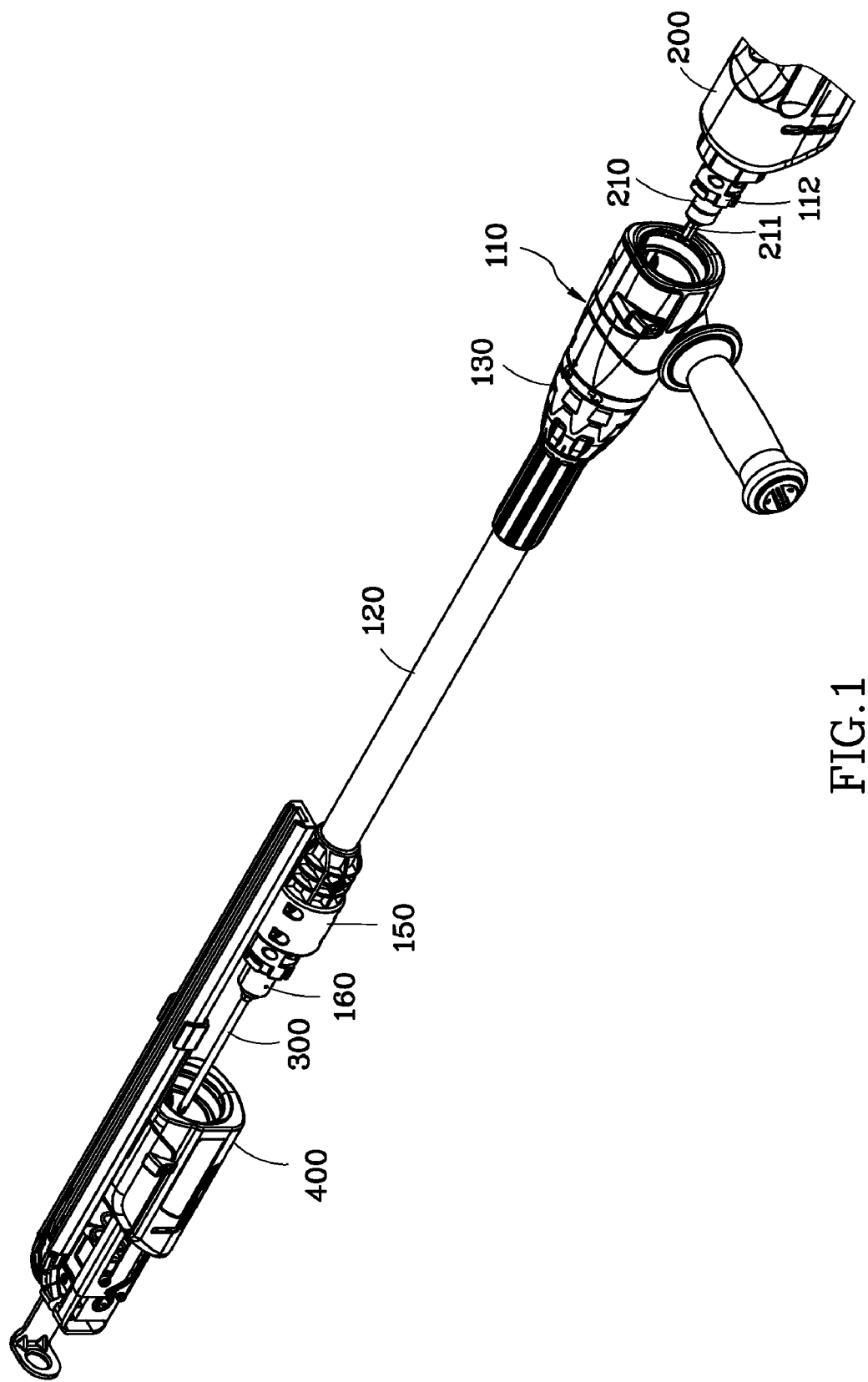
FIG. 1 is a perspective view, showing a transmission extension adapter of a preferred embodiment of the present invention connected between a work head and a power hand tool with an automatic feeder affixed thereto.
Figure 2:
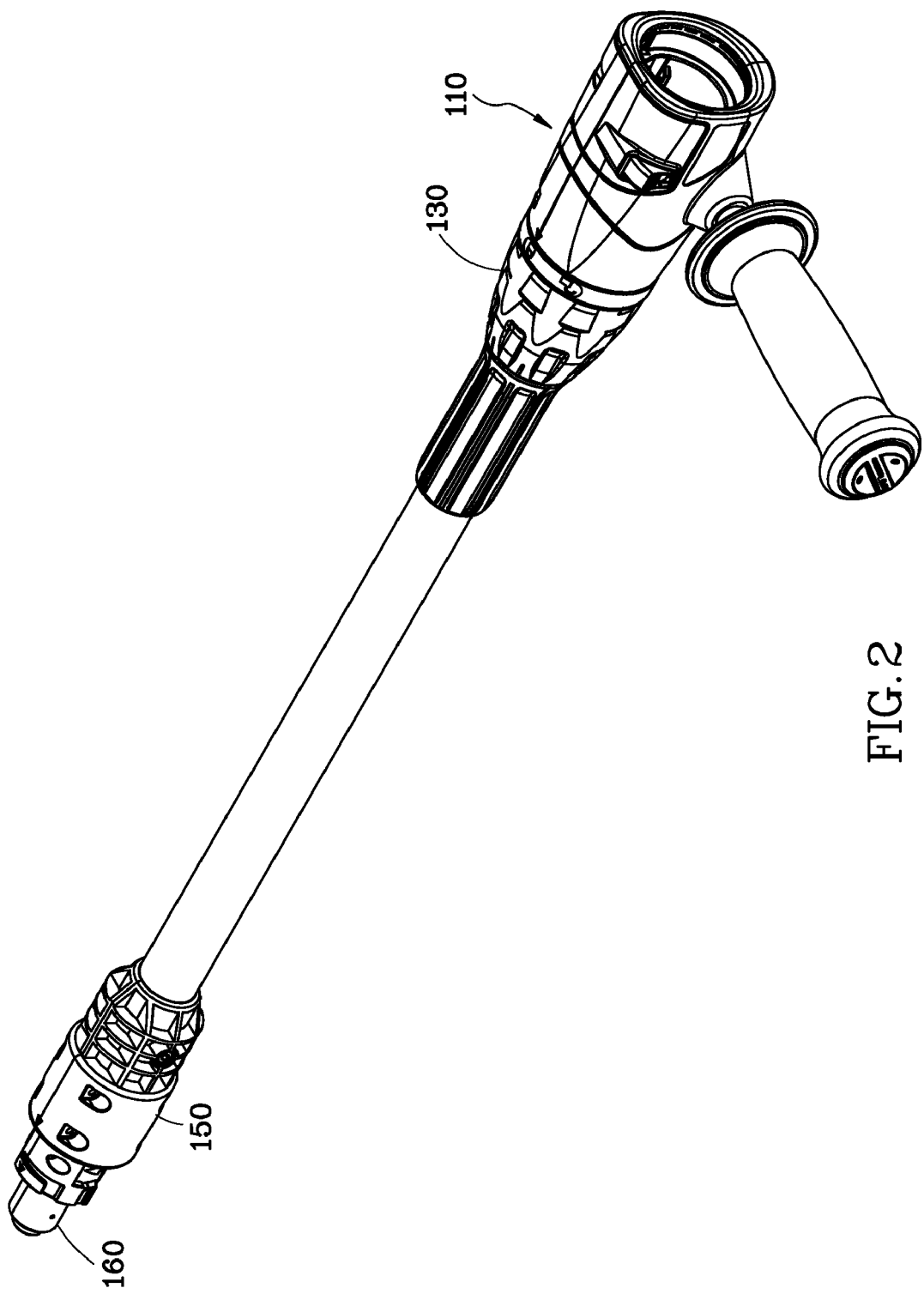
FIG. 2 is a perspective view of the transmission extension adapter according to the preferred embodiment of the present invention.

Referring to FIGS. 1 and 2, a transmission extension adapter in accordance with the present invention is shown for connecting a work head 300 at an end thereof and the chuck 210 of a power hand tool 200 at the other end thereof. The work head 300 can be a screwdriver tip or drill bit. According to this embodiment, the work head 300 is a screwdriver tip, and an automatic feeder 400 is provided at the front side of the transmission extension adapter to feed screws to the work head 300. The transmission extension adapter comprises a rear cap assembly 110, an axle sleeve 120, a multi-angle positioning device 130, a transmission axle 140, a front cap assembly 150, and an auxiliary chuck 160.

As shown in FIG. 1, the chuck 210 is disposed on the front side of the power hand tool 200, and linked to the power drive (not shown) inside the power hand tool 200 through a transmission gear set (not shown). The power drive can be a motor or air turbine that outputs high power and high speed revolution. The transmission gear set reduces the output speed of revolution and amplifies the torque, so that the output of the power hand tool can meet the requirement of the work head 300.

Figure 3:
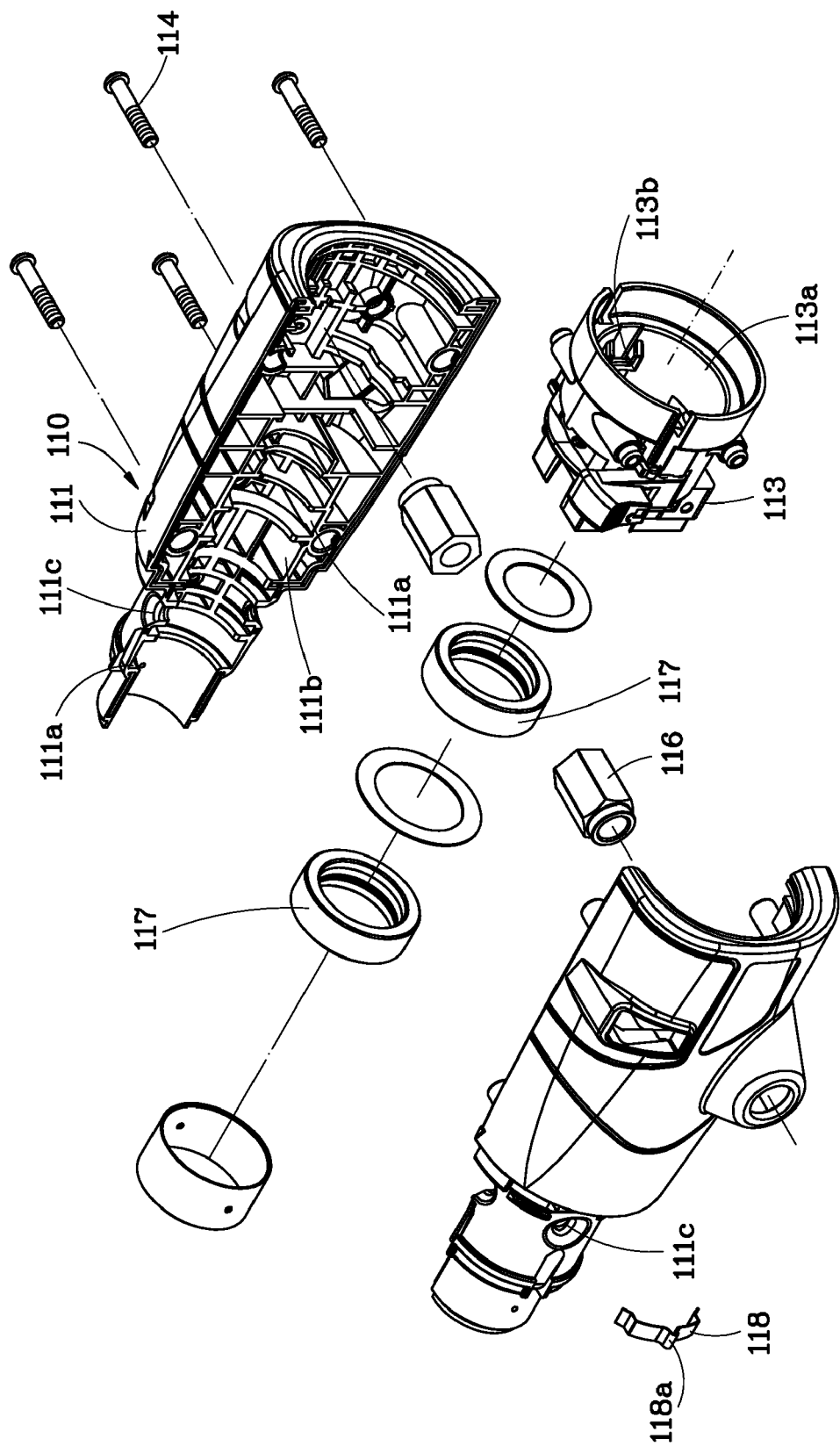
FIG. 3 is an exploded view of the rear cap assembly according to the preferred embodiment of the present invention.
Figure 4:
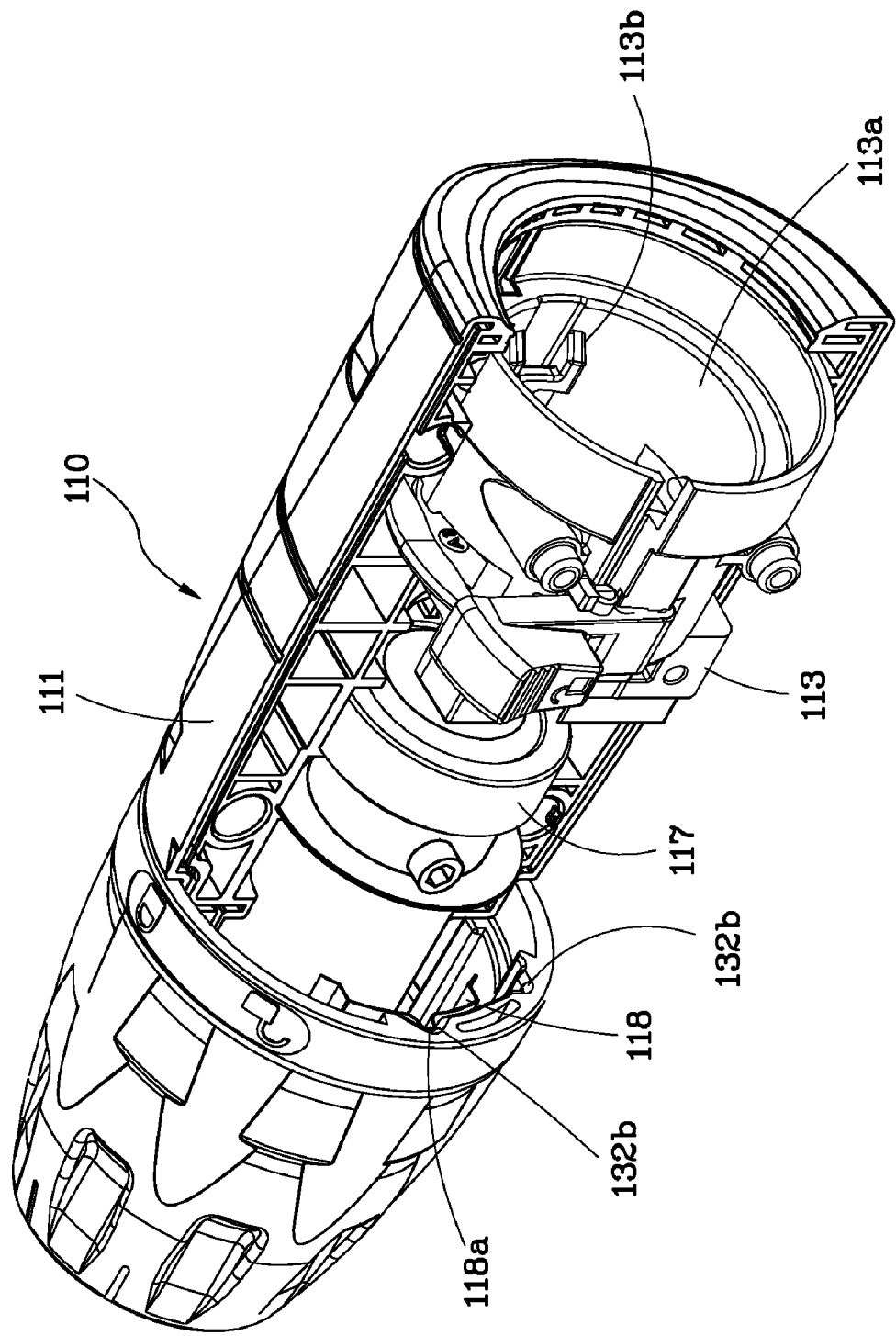
FIG. 4 is a perspective and partial cutaway view of the rear cap assembly according to the preferred embodiment of the present invention.
Figure 5:
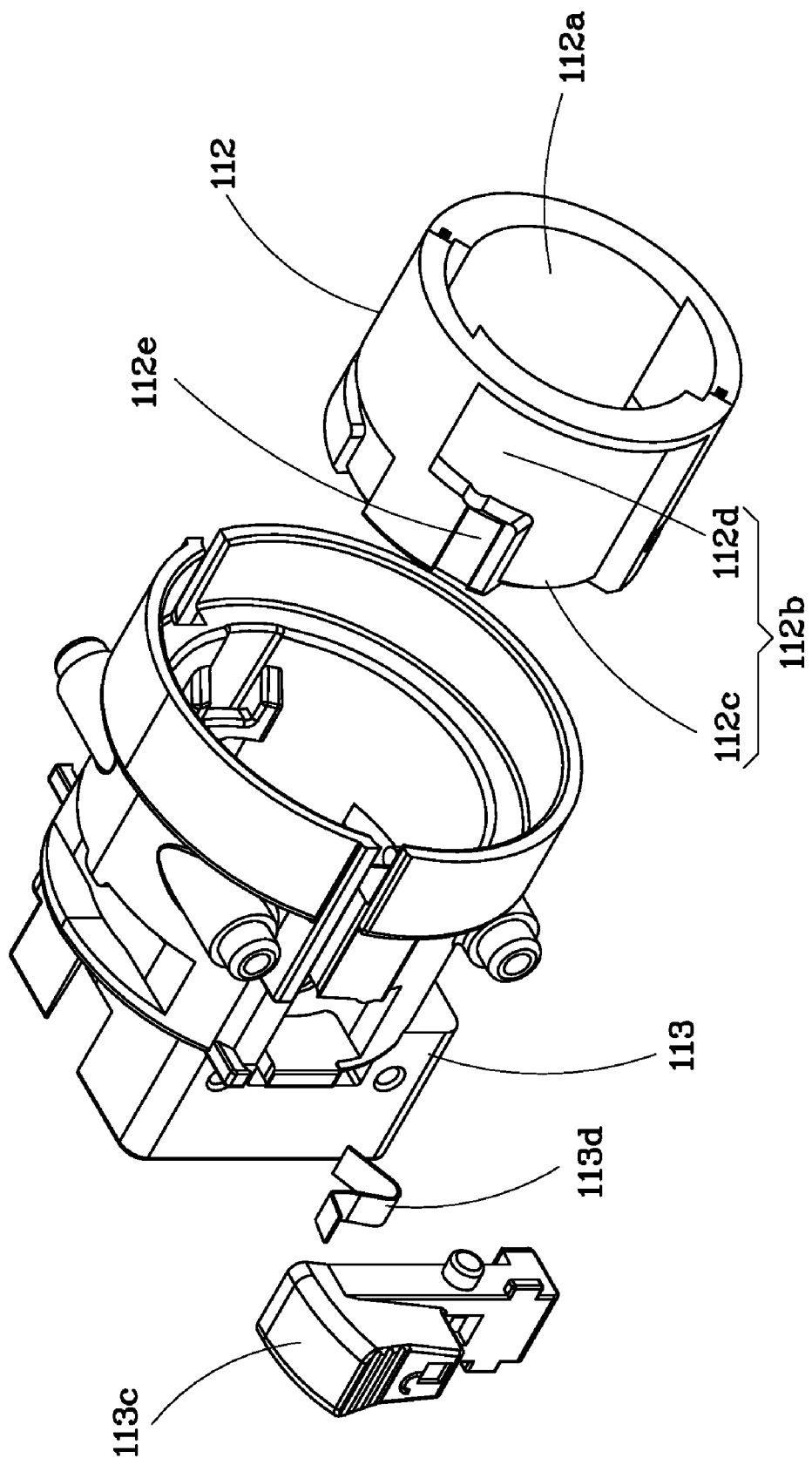
FIG. 5 is an exploded view of a part of the transmission extension adapter in accordance with the preferred embodiment of the present invention, showing the structure of the connector and the connection member.

Referring to FIGS. 3-5, the rear cap assembly 110 is adapted for detachably affixing the transmission extension adapter to the front side of the power hand tool 200, so that the transmission extension adapter can receive the power output of the power hand tool 200. The rear cap assembly 110 comprises a cylindrical cap shell 111 and a connector 112. The connector 112 is normally affixed to the front side of the power hand tool 200, having an axial coupling hole 112a for the passing of the chuck 210 of the power hand tool 200. The connector 112 further has two first connection structures 112b and two first retaining grooves 112e on the periphery. Each first connection structure 112b comprises a longitudinally extending first guide groove 112c and a transversely extending first locating groove 112d. The first guide groove 112c and the first locating groove 112d are communicated with each other in an L-shaped manner.

Referring to FIGS. 3 and 4, the cylindrical cap shell 111 is detachably coupled to the connector 112, thereby secured to the front side of the power hand tool 200, and therefore the rear cap assembly 110 is connected to the front side of the power hand tool 200 to have the chuck 210 be received inside the cylindrical cap shell 111. The cylindrical cap shell 111 holds inside a connection member 113, which is affixed in place by screws 114. The connection member 113 has a connection hole 113a, which receives the chuck 210 and the connector 112. The connection member 113 further comprises two first connection blocks 113b protruding from the circumference wall of the connection hole 113a and corresponding to the two first connection structure 112b of the connector 112.

Figure 6:
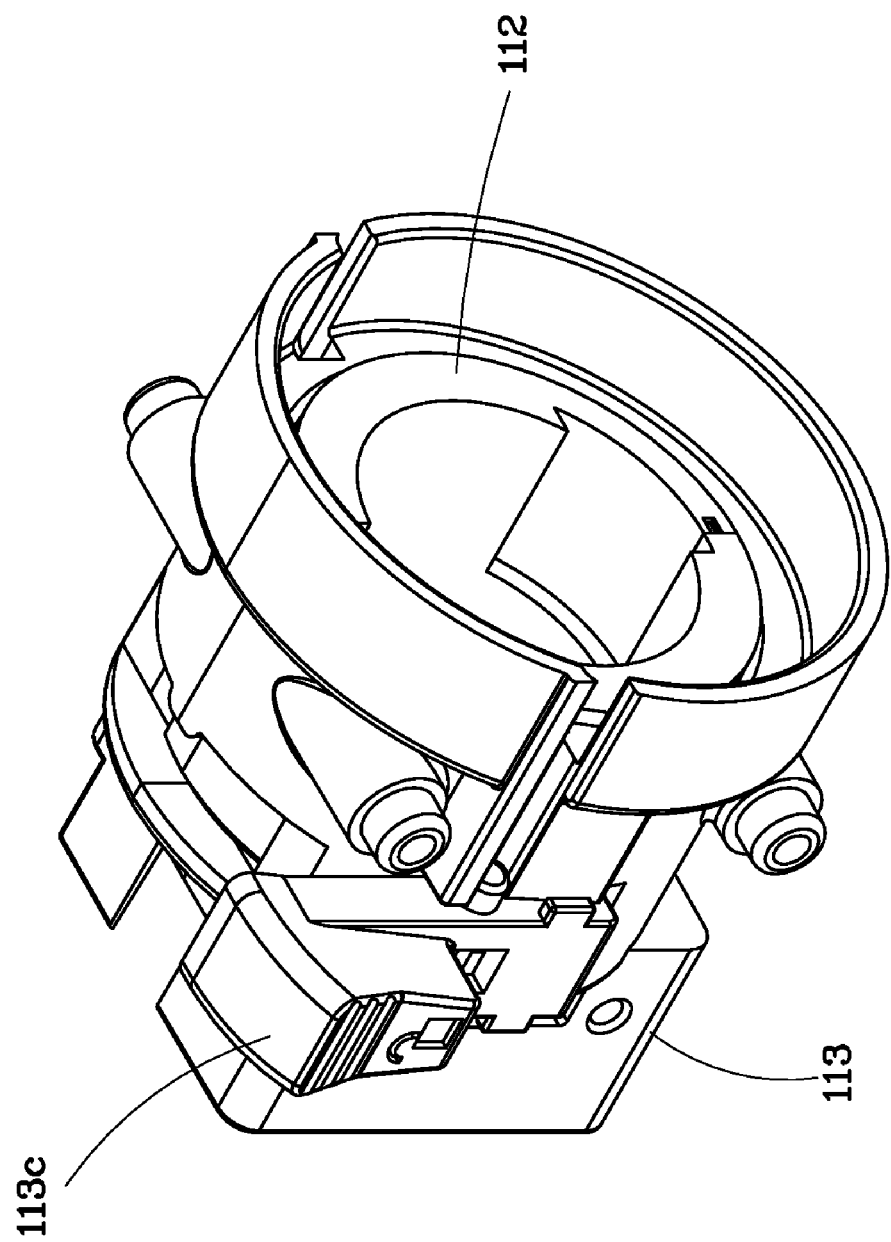
FIG. 6 is an assembly view of FIG. 5.

Referring to FIGS. 5 and 6, the first connection blocks 113b of the connection member 113 are respectively insertable through the first guide grooves 112c of the first connection structure 112b of the connector 112 into the respective first locating grooves 112d. By means of rotating the cylindrical cap shell 111 relative to the connector 112 in one direction, the first connection blocks 113b of the connection member 113 are respectively engaged into the ends of the respective first locating grooves 112d to have the connection member 113 be secured to the connector 112, thereby affixing the cylindrical cap shell 111 to the front side of the power hand tool 200.

Figure 7:
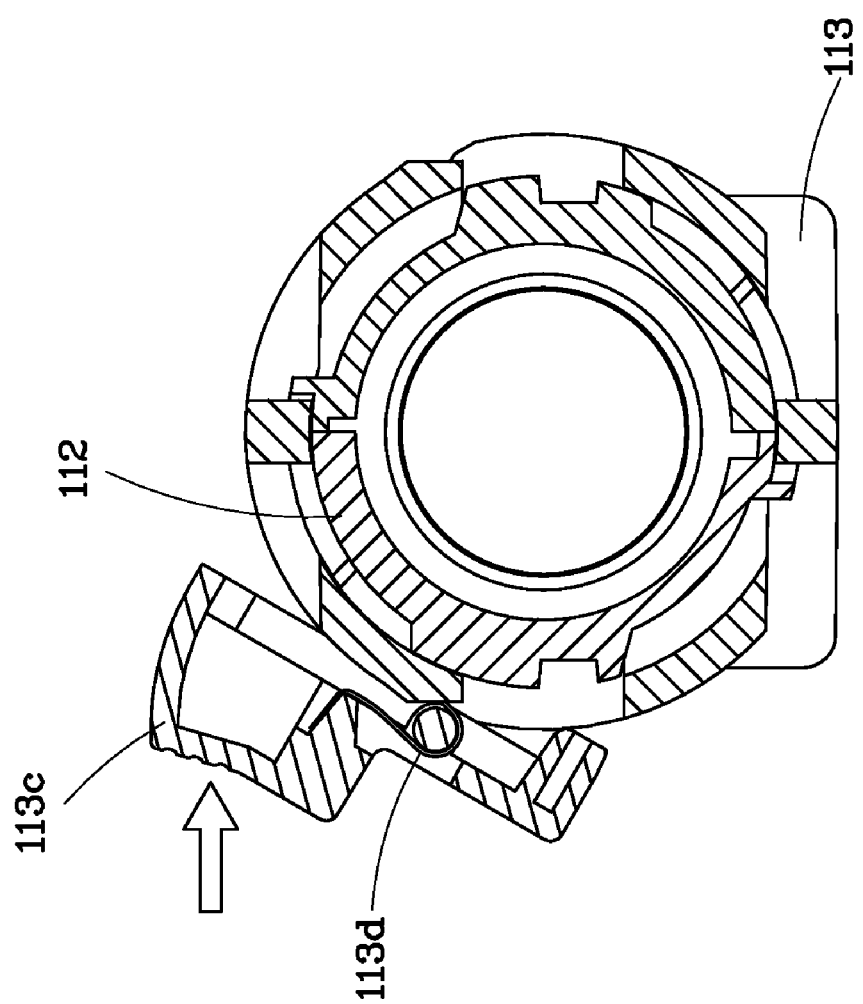
FIG. 7 is a cross sectional view of the assembly shown in FIG. 6.

Referring to FIG. 7 and FIGS. 5 and 6 again, to avoid disconnection of the connection member 113 from the connector 112 due to rotation of the connection member 113 with the cylindrical cap shell 111 relative to the connector 112 caused the by an external force, two first locking members 113c are provided to stop the cylindrical cap shell 111 from rotation relative to the connector 112. The first locking members 113c are respectively pivoted to the cylindrical cap shell 111 and biased by a respective spring member 113d to have the front end of each first locking member 113c be respectively inserted through the connection member 113 and stopped against the connector 112. When the first connection blocks 113b of the connection member 113 are respectively engaged into the ends of the respective first locating grooves 112d, one end of each first locking member 113c is inserted into the associated first retaining groove 112e of the connector 112 to prohibit the connection member 113 and the cylindrical cap shell 111 from rotation relative to the connector 112. The first locking members 113c respectively extend through the cylindrical cap shell 111 to the outside for pressing by a user so that a user can bias the first locking members 113c to disengage the respective front ends of the first locking members 113c from the respective first retaining grooves 112e of the connector 112 for allowing rotation of the cylindrical cap shell 111 relative to the connector 112 so that the cylindrical cap shell 111 can be disconnected from the connector 112.

Figure 8:
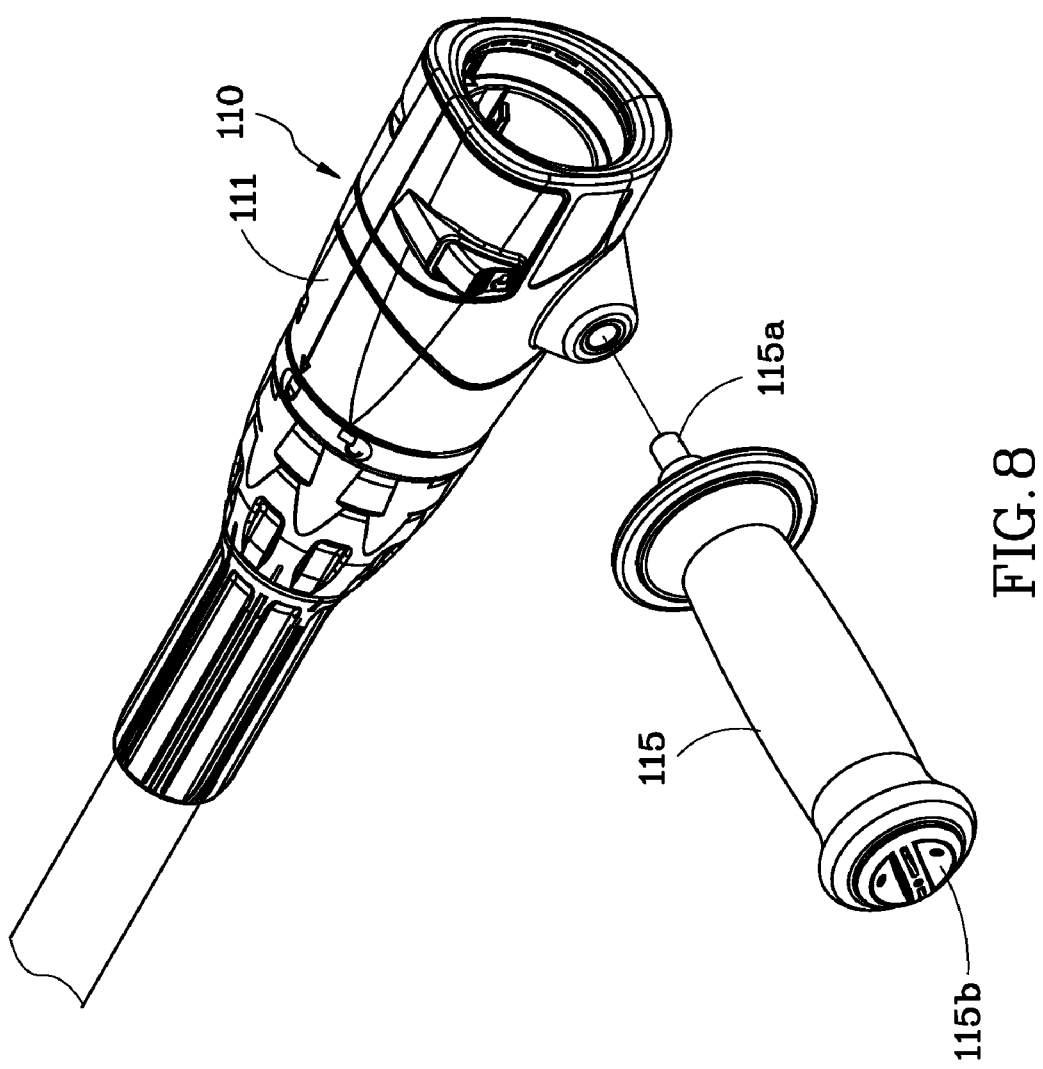
FIG. 8 is an exploded view of a part of the transmission extension adapter in accordance with the preferred embodiment of the present invention, showing the handle disconnected from the rear cap assembly.
Figure 9:
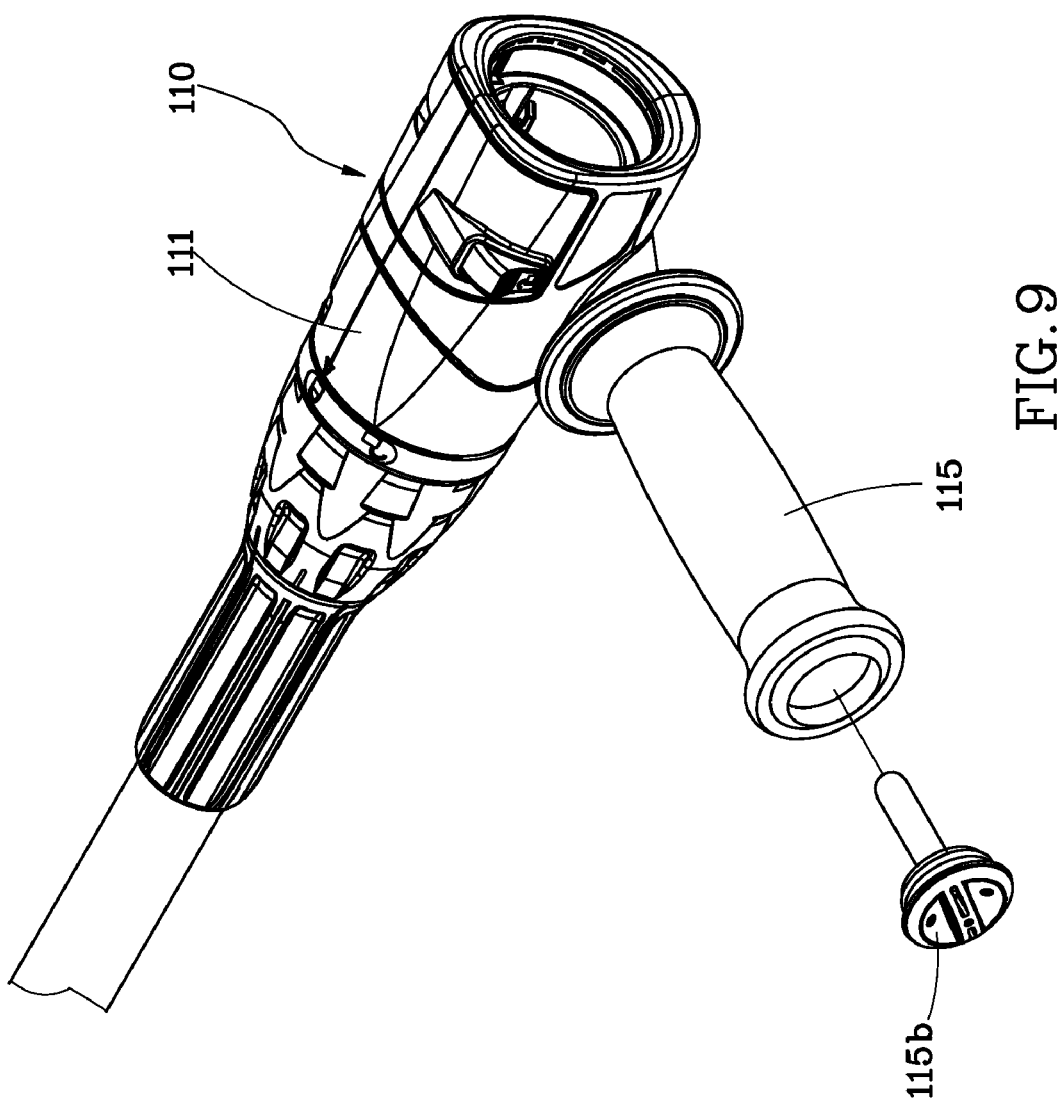
FIG. 9 corresponds to FIG. 8, showing the handle fastened to the rear cap assembly and the end cap disconnected from the handle.

Referring to FIGS. 8 and 9, the invention further comprises a handle 115. The handle 115 is a hollow member, having one end terminating in a screw rod 115a and the other end detachably capped with an end cap 115b. The screw rod 115a is screwingly connected to the cylindrical cap shell 111 so that a user can hold the handle 115 in a transverse direction. The cylindrical cap shell 111 is made from a light material, for example, plastics. If a screw hole is directly formed in the cylindrical cap shell 111 for the mounting of the screw rod 115a of the handle 115, the internal threads of the screw hole may easily be damaged by the screw rod 115a. Therefore, the cylindrical cap shell 111 does not provide a screw hole for the mounting of the screw rod 115a of the handle 115 directly. As shown in FIG. 3, two nuts 116 are embedded in the cylindrical cap shell 111, and the screw rod 115a is inserted through a through hole on the cylindrical cap shell 111 and then threaded into one of the nuts 116, thereby securing the handle 115 to the periphery of the cylindrical cap shell 111. The number of the nut 116 can be one or more, and the one or more nuts 116 can be embedded in the cylindrical cap shell 111 at different locations so that a user can selectively fastening the screw rod 115a of the handle 115 to one nut 116 as desired, fitting individual's operation preference. The end cap 115b can be opened from the handle 115 to facilitate storage and replacement of the work head 300.

Figure 10:
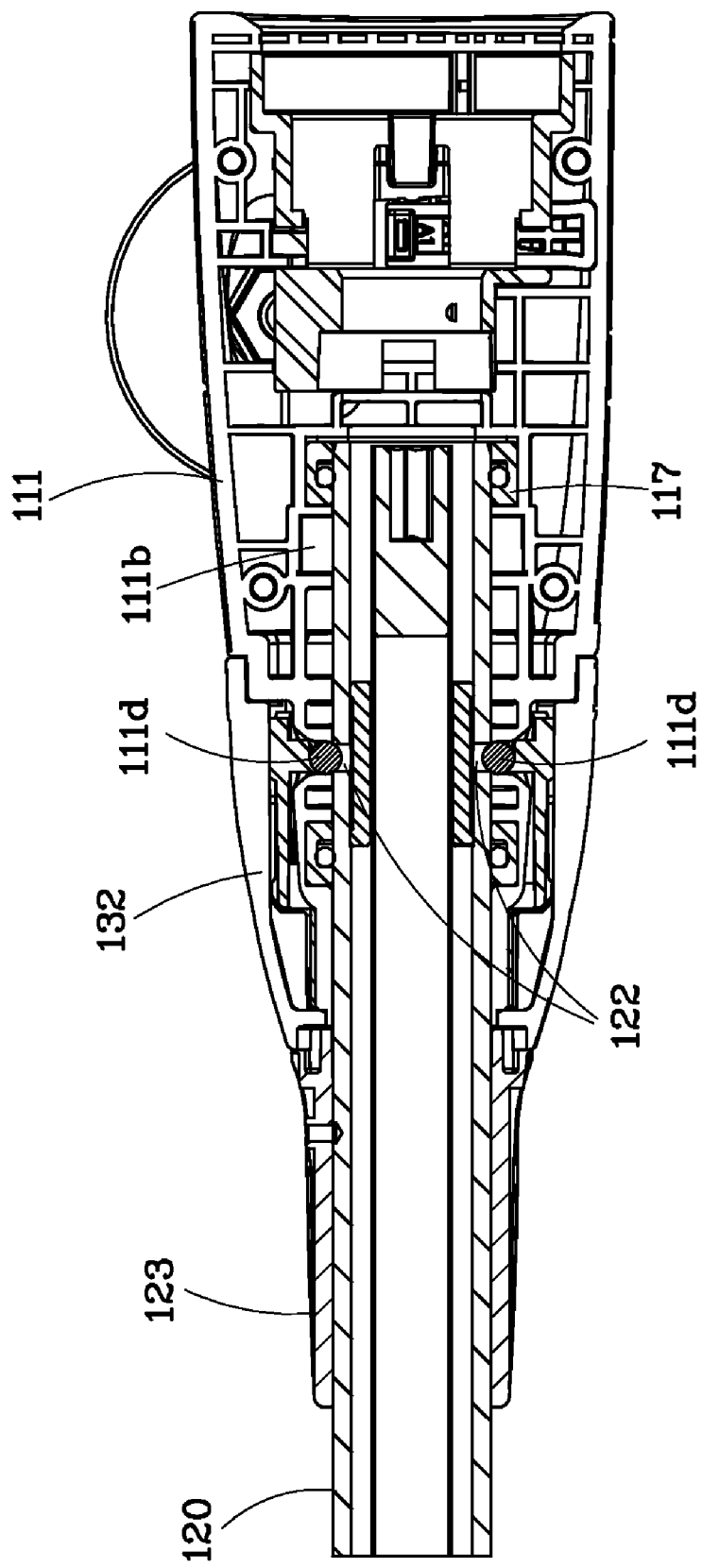
FIG. 10 is a sectional view of a part of the transmission extension adapter in accordance with the preferred embodiment of the present invention, showing the positioning members held in the respective locating holes of the axle sleeve.

Referring to FIG. 10 and FIGS. 3 and 4 again, the cylindrical cap shell 111 has at least one, for example, two bearing seats 111a and an annular groove 111b provided therein at the front side. Each bearing seat 111a holds a respective bearing 117. The cylindrical cap shell 111 further has a plurality of through holes 111c, each accommodating a positioning member 111d.

Figure 11:
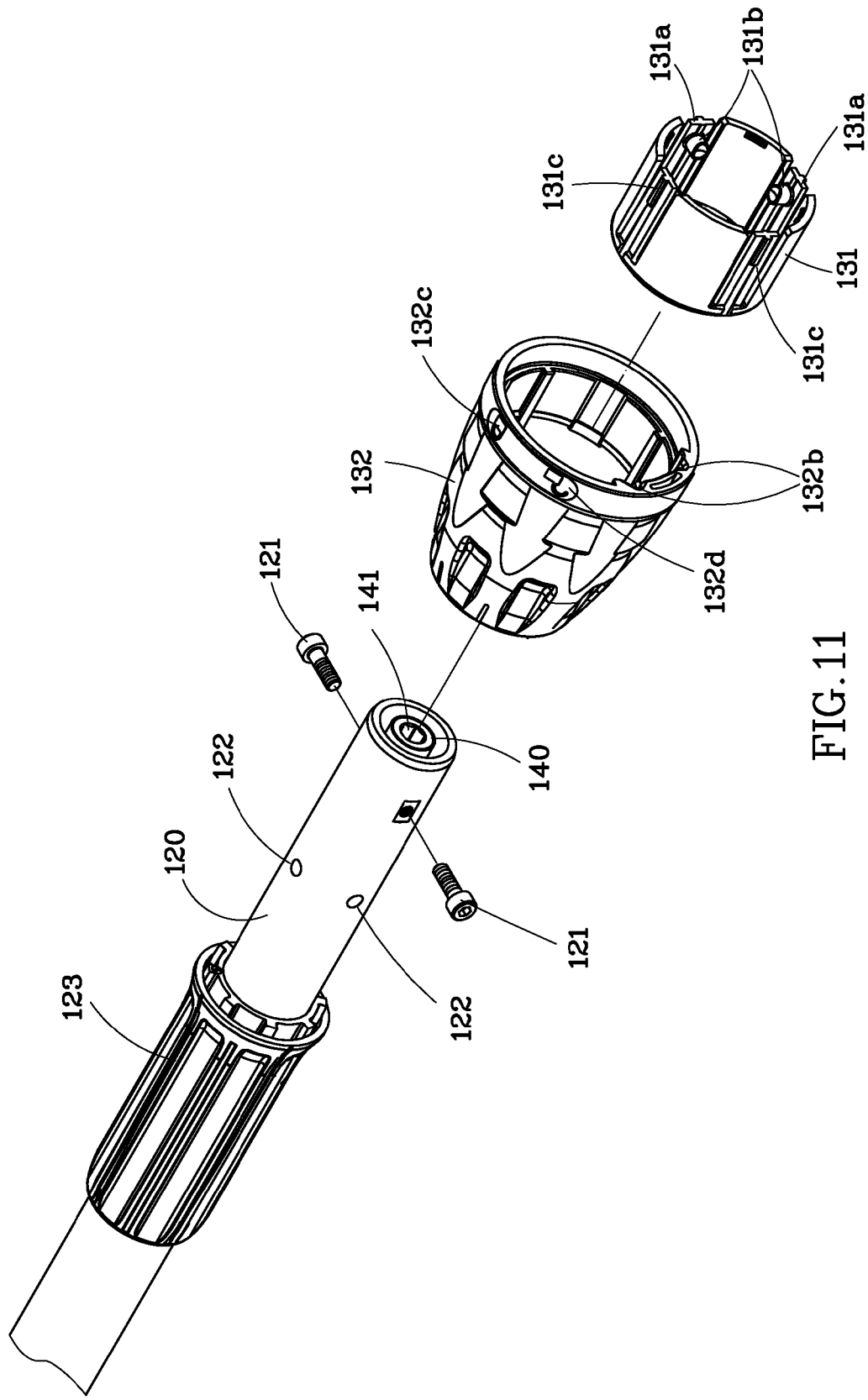
FIG. 11 is an exploded view of a part of the transmission extension adapter in accordance with the preferred embodiment of the present invention, showing the arrangement of the multi-angle positioning device, the transmission axle and the axle sleeve.

Referring to FIG. 11 and FIG. 10 again, the rear end of the axle sleeve 120 is inserted into the cylindrical cap shell 111 and the bearings 117 so that the axle sleeve 120 is rotatably coupled to the cylindrical cap shell 111. Further, the axle sleeve 120 comprises a plurality of locating members, for example, screw rods 121 protruding over the periphery and received in the annular groove 111b of the cylindrical cap shell 111 to prohibit axial movement of the axle sleeve 120. Therefore, the axle sleeve 120 can be rotated relative to the cylindrical cap shell 111 and will not be disconnected from the cylindrical cap shell 111. Washer is provided in annular groove 111b of the cylindrical cap shell 111 to avoid direct contact between the locating members 121 and the inside wall of the cylindrical cap shell 111. The axle sleeve 120 has one or a number of locating holes 122 on the periphery corresponding to the through holes 111c of the cylindrical cap shell 111. The locating holes 122 can be shifted into alignment with the through holes 111c subject to a rotary motion of the axle sleeve 120 relative to the cylindrical cap shell 111. The positioning members 111d can be steel balls, pins or sliding blocks for engaging into the locating holes 122. When the positioning members 111d are stopped in the locating holes 122 by an external pressure, the axle sleeve 120 is locked to the cylindrical cap shell 111. The transmission extension adapter further comprises a guard 123 sleeved onto the axle sleeve 120 and fixedly secured thereto. The guard 123 has an anti-slip structure so that a user can hold the guard 123 and rotate the axle sleeve 120 positively.

Referring to FIGS. 10 and 11 again, the multi-angle positioning device 130 is adapted for locking the axle sleeve 120, comprising a locating ring 131 and a collar 132. The locating ring 131 is sleeved onto the front side of the cylindrical cap shell 111, having a plurality of axially extending suspension arms 131a. Each suspension arm 131a has a front free end terminating in a holding down block 131b. The holding down block 131b of the suspension arms 131a are respectively inserted into the through holes 111c of the cylindrical cap shell 111 and pressed on the positioning members 111d. Further, when the suspension arms 131a are held down and prohibited from outward movement, the positioning members 111d are held down in position by the respective holding down blocks 131b and prohibited from outward movement. The collar 132 is sleeved onto the locating ring 131, having a plurality of pressure means 132a, for example, pressure ribs or pressure blocks protruding from the inside wall corresponding to the suspension arms 131a. The collar 132 is rotatable relative to the locating ring 131 or cylindrical cap shell 111 within a limited angle between a locking position and an unlocking position to selectively press the pressure means 132a on the suspension arms 131a or to release the pressure means 132a from the suspension arms 131a. When the pressure means 132a are pressed on the suspension arms 131a, the pressure means 132a are moved to the top side of the suspension arms 131a and forced to hold down the suspension arms 131a, subject to rotation of the collar 132.

Referring to FIGS. 4 and 11 again, the collar 132 has two notches 132b at the rear side. Further, a spring strip 118 is mounted in the cylindrical cap shell 111, having a middle protruding positioning portion 118a. Following rotation of the collar 132, the middle protruding positioning portion 118a is forced into one notch 132b, causing a clicking sound to let the user know the positioning status. When the middle protruding positioning portion 118a is forced into one notch 132b, the pressure means 132a are moved to the top side of the suspension arms 131a and forced to hold down the suspension arms 131a. When the middle protruding positioning portion 118a is forced into the other notch 132b, the pressure means 132a are moved away from the suspension arms 131a, and therefore the suspension arms 131a are released from the constraint. Further, the middle protruding positioning portion 118a is confined to move between the two notches 132b, thereby limiting the angle of rotation of the collar 132 relative to the cylindrical cap shell 111 and the locating ring 131.

Figure 13A:
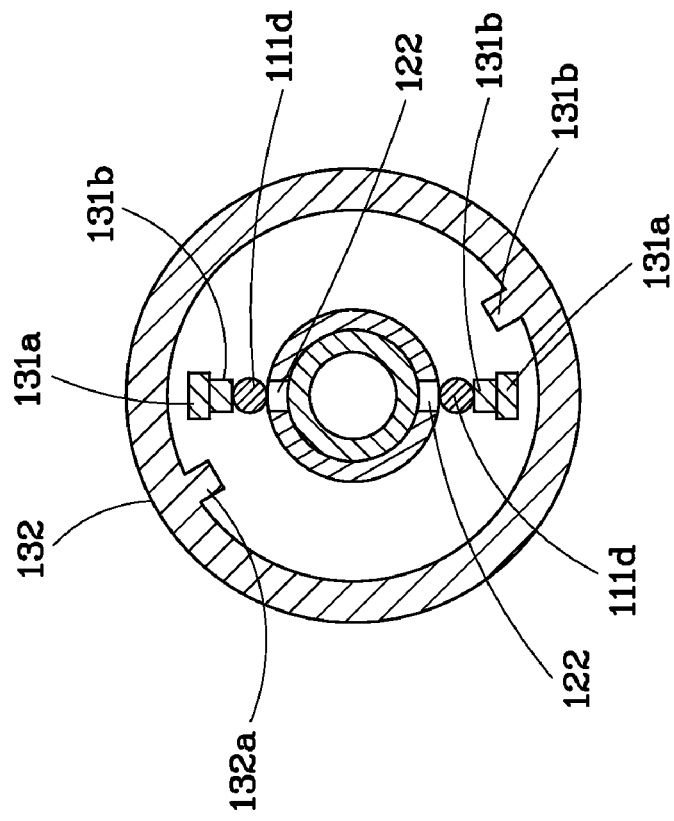
FIG. 13A is a sectional view taken along line 13A-13A of FIG. 12A.

Referring to FIGS. 12A and 13A and FIG. 11 again, when the pressure means 132a are moved to the top side of the suspension arms 131a following rotation of the collar 132, the middle protruding positioning portion 118a is forced into one notch 132b, causing a clicking sound to remind the user. The collar 132 has a locking mark 132c on the outside wall that is aimed at a positioning mark on the outside wall of the cylindrical cap shell 111, giving an indication of the current locking status to the user. At this moment, the collar 132 presses on the bearing portion, formed on outer surface of the suspension arms 131a and referenced by 131c, or on the suspension arms 131a of the locating ring 131 directly, to prohibit the suspension arms 131a from outward deformation, thereby forcing the suspension arms 131a to hold down the positioning members 111d. The pressure from the collar 132 keeps the positioning members 111d in the respective locating holes 122 of the axle sleeve 120, and therefore the axle sleeve 120 is locked by the positioning members 111d and prohibited from movement in longitudinal direction.

Figure 13B:
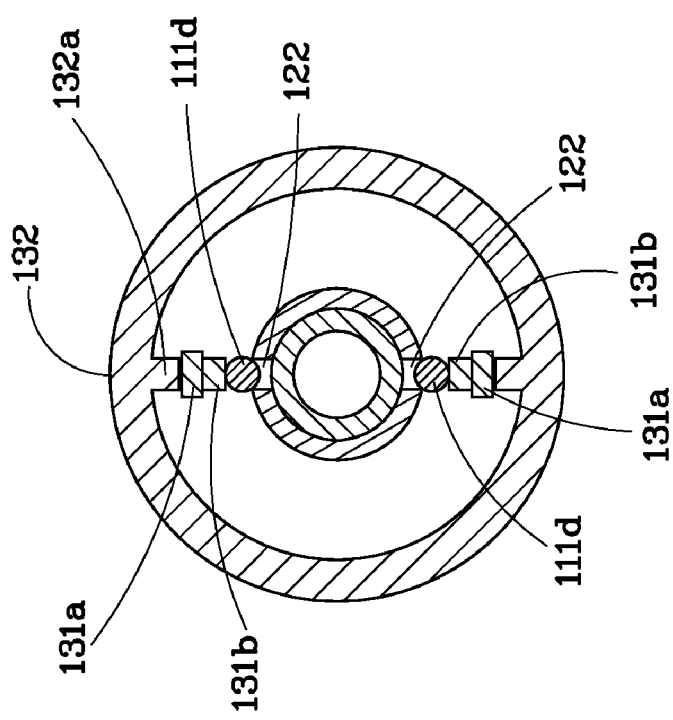
FIG. 13B is a sectional view taken along line 13B-13B of FIG. 12B.

Referring to FIGS. 12B and 13B and FIG. 11 again, when the pressure means 132a are moved in the reversed direction following rotation of the collar 132 and released from the suspension arms 131a, the middle protruding positioning portion 118a is forced into the other notch 132b, causing a clicking sound to remind the user. The collar 132 has an unlocking mark 132c on the outside wall that is aimed at the positioning mark on the outside wall of suspension arms 131a at this time, giving an indication of the current unlocking status to the user. At this time, the holding down blocks 131b are pressed on the positioning members 111d by means of the spring force of the suspension arms 131a, and the suspension arms 131a are deformable outwards. When the axle sleeve 120 is rotated at this time, the positioning members 111d will be moved away from the locating holes 122 to push the holding down blocks 131b outwards. When the axle sleeve 120 is continuously rotated in the same direction to shift the locating holes 122 to the position corresponding to the through holes 111c, the spring force of the suspension arms 131a forces the holding down blocks 131b into the locating holes 122 again. When rotating the axle sleeve 120 forwards at this time, the pressure means 132a are moved to the top side of the suspension arms 131a, thereby locking the axle sleeve 120 again.

Referring to FIGS. 1 and 11 again, the transmission axle 140 is inserted into the axle sleeve 120 for transmission of the output power of the power hand tool 200. The transmission axle 140 has a coupling hole 141 at the rear end. After connection of the rear cap assembly 110 to the power hand tool 200, the rear end of the transmission axle 140 and the rear end of the axle sleeve 120 are aimed at the central axis of the chuck 210. At this time, the chuck 210 holds a connection rod 211. The front end of the connection rod 211 is inserted into the coupling hole 141 of the transmission axle 140 to let the rear end of the transmission axle 140 be connected to the chuck 210. For enabling the transmission axle 140 be rotated smoothly in the axle sleeve 120 and avoiding friction between the transmission axle 140 and the inside wall of the axle sleeve 120, axle bearings are provided inside the axle sleeve 120 to support the transmission axle 140.

Figure 14:
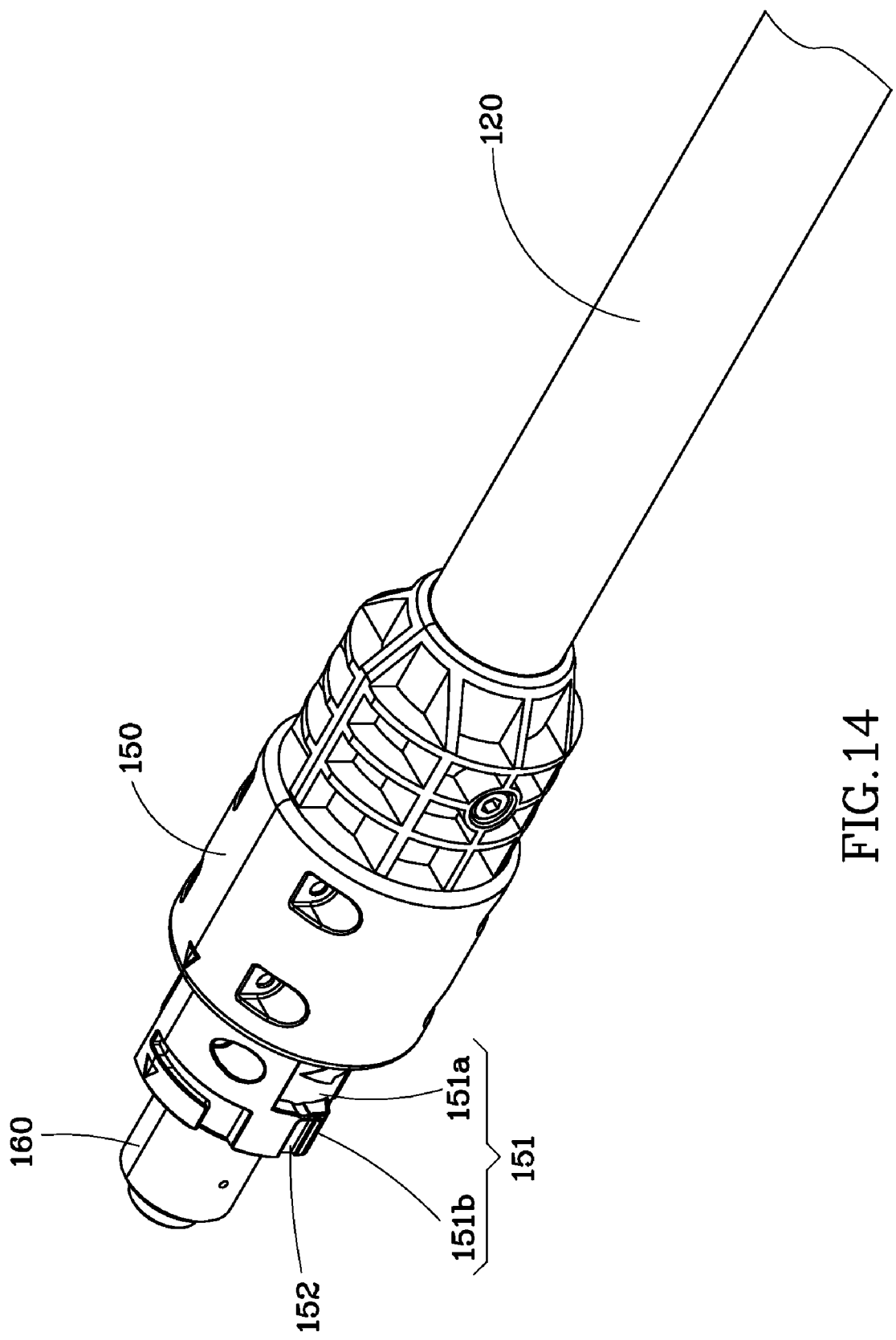
FIG. 14 is a perspective view of a part of the transmission extension adapter in accordance with the preferred embodiment of the present invention, showing the arrangement of the supplementary chuck, the front cap assembly and the axle sleeve.
Figure 15:
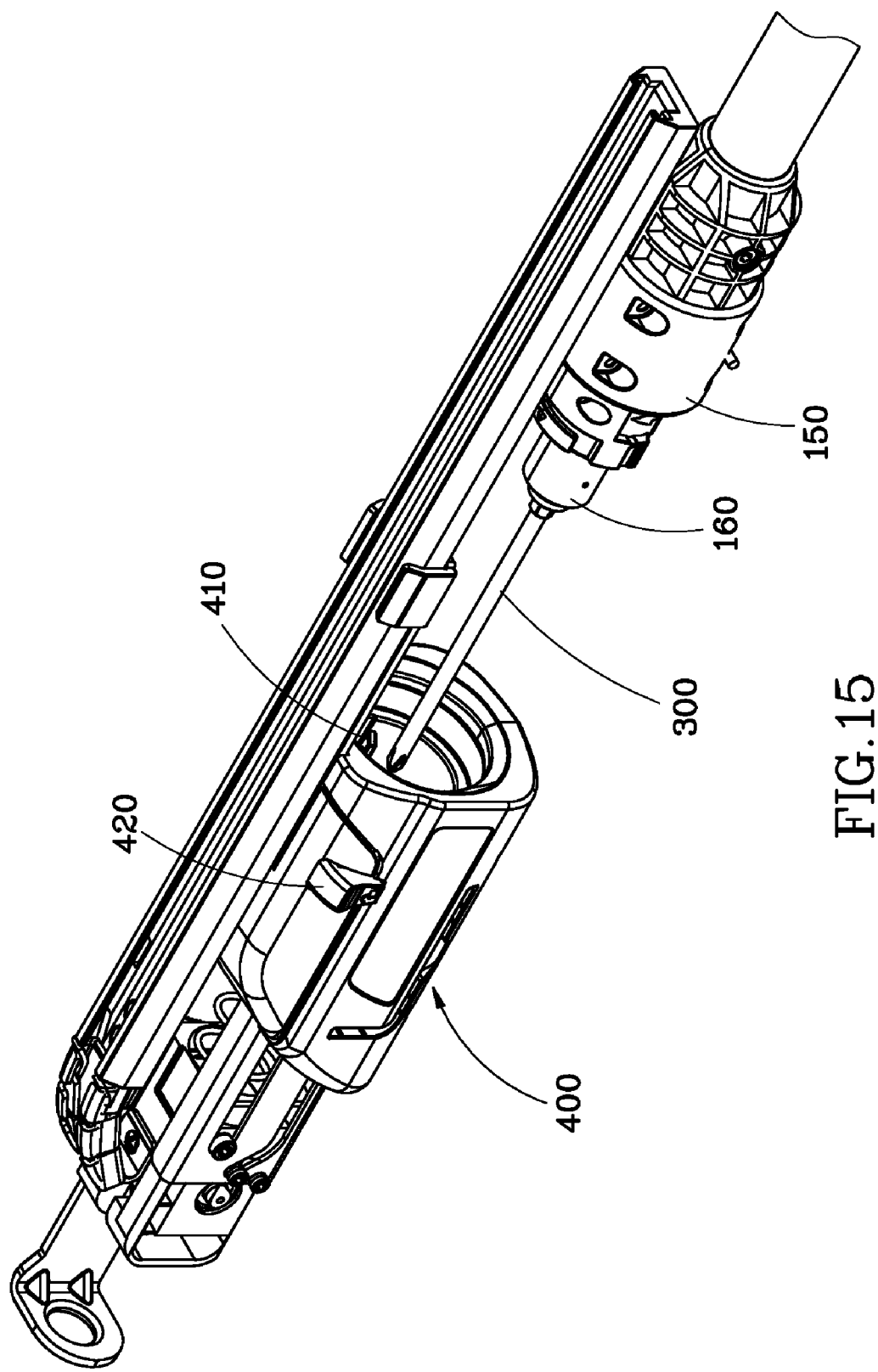
FIG. 15 is a perspective drawing, showing the arrangement of the automatic feeder and the transmission extension adapter of the preferred embodiment of the present invention.

Referring to FIGS. 14 and 15, the front cap assembly 150 is fastened to the front end of the axle sleeve 120 and capped on the supplementary chuck 160. The front cap assembly 150 has two second connection structures 151 and two second retaining grooves 152 on the periphery. Each second connection structure 151 comprises a longitudinally extending first guide groove 151b and a transversely extending second locating groove 151a. The second guide groove 151b and the second locating groove 151a are communicated with each other in an L-shaped manner. The second retaining grooves 152 are respectively disposed in front of the second locating groove 151a.

Referring to FIGS. 15 and 16, the supplementary chuck 160 is disposed at the front side of the axle sleeve 120 inside the front cap assembly 150. The supplementary chuck 160 is connected to the transmission axle 140 by which the supplementary chuck 160 is coupled to the power hand tool 200 and rotatable by the power hand tool 200. The supplementary chuck 160 is adapted for chucking a work head 300, for example, screwdriver tip or drill bit.

The front cap assembly 150 surrounds the front end of the axle sleeve 120 and the top side of the supplementary chuck 160, blocking the gap between the axle sleeve 120 and the supplementary chuck 160. Further, the front cap assembly 150 is used for the coupling of the automatic feeder 400 such that the automatic feeder 400 can be fixedly provided in front of the axle sleeve 120, and the supplementary chuck 160 can be inserted through the automatic feeder 400. The automatic feeder 400 comprises two second connection blocks 410 bilaterally protruding from the inside wall thereof and corresponding to the two second connection structures 151 of the front cap assembly 150, and two second locking members 420 corresponding to the second retaining grooves 152. When the automatic feeder 400 is sleeved onto the front cap assembly 150, the second connection blocks 410 are respectively moved along the second guide grooves 151b of the respective second connection structures 151 to the respective second locating groove 151a, and then the automatic feeder 400 is rotated relative to the front cap assembly 150 to move the second connection blocks 410 to the respective inner ends of the second locating groove 151a, prohibiting the automatic feeder 400 from longitudinal displacement. The two second locking members 420 are for engaging into the second retaining grooves 152 to stop the automatic feeder 400 from rotation, prohibiting disconnection of the second connection blocks 410 from the second connection structures 151.

The aforesaid second connection structures 151 are for engagement with the automatic feeder 400 to lock the automatic feeder 400 to the front cap assembly 150, i.e., to lock the automatic feeder 400 to the front side of the axle sleeve 120. The second connection structures 151 are not limited to the disclosed configuration. They are configured subject to the connection structure of the automatic feeder 400, i.e., when a different type of front cap assembly 150 is used, a different type of automatic feeder 400 can be secured to the front side of the axle sleeve 120.

The transmission extension adapter extends the distance between the work head 300 and the power hand tool 200 to facilitate working of the work head 300 at a long distance. By means of the automatic feeder 400 to feed fasteners such as screws or nails, the user needs not to approach the workpiece when holding the power hand tool 200. In a certain occasion, the feeding direction of the automatic feeder 400 may be changed without changing its extending direction so as to enter a narrow working space. At this time, the user needs not to change the power hand tool 200 holding posture. Instead, the collar 132 can be rotated to the unlocking position to release the pressure means 132a from the suspension arms 131a and holding down blocks 131b of the locating ring 131. At this time, the axle sleeve 120 of the transmission extension adapter is rotatable to cause rotation of the automatic feeder 400 relative to the power hand tool 200. Thereafter, the positioning members 111d are respectively engaged into the locating holes 122 of the axle sleeve 120, and the automatic feeder 400 is rotated to the desired angle, and then the collar 131 can be rotated to the locking position, causing the pressure means 132a to hold down the suspension arms 131a and holding down blocks 131b of the locating ring 131, keeping the positioning members 111d in the locating holes 122 of the axle sleeve 120, and thus the axle sleeve 120 is locked again.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A transmission extension adapter for connecting a work head to a chuck of a power hand tool, the transmission extension adapter comprising:
   a cylindrical cap shell for connection to said power hand tool to accommodate said chuck, said cylindrical cap shell having a plurality of through holes, in each of which a positioning member is accommodated;
   an axle sleeve having an end rotatably connected to said cylindrical cap shell and at least one locating hole at a periphery thereof for receiving at least one of said positioning members;
   a transmission axle inserted through said axle sleeve and provided with an end for connection to said chuck of said power hand tool;
   a multi-angle positioning device for locking said axle sleeve to said cylindrical cap shell, said multi-angle positioning device comprising
      a locating ring sleeved onto said cylindrical cap shell and provided with a plurality of axially extending suspension arms, each said suspension arm having a holding down block, the holding down blocks of said suspension arms being respectively inserted into said through holes of said cylindrical cap shell and elastically and respectively pressing on said positioning members; and
      a collar sleeved onto and rotatable relative to said locating ring, said collar having a plurality of pressure members movable with rotary motion of said collar relative to said locating ring between a locking position where said pressure members press on said holding down blocks of said suspension arms against said positioning members and an unlocking position where said pressure members are released from said holding down blocks of said suspension arms;
   a front cap assembly fastened to an opposite end of said axle sleeve opposite to said cylindrical cap shell; and
   a supplementary chuck received inside said front cap assembly and connected to an opposite end of said transmission axle opposite to said chuck of said power hand tool for chucking said work head.

2. The transmission extension adapter as claimed in claim 1, further comprising a connector configured to be affixed to a front side of said power hand tool around said chuck of said power hand tool for detachably connecting said cylindrical cap shell to said power hand tool.

3. The transmission extension adapter as claimed in claim 2, wherein said connector comprises at least one first connection structure; said cylindrical cap shell comprises at least one first connection block for connection to said at least one first connection structure of said connector.

4. The transmission extension adapter as claimed in claim 3, wherein said first connection structure of said connector comprises a longitudinally extending first guide groove and a transversely extending first locating groove for the sliding of said first connection block.

5. The transmission extension adapter as claimed in claim 4, wherein said cylindrical cap shell is provided with a connection member having a connection hole, which receives said chuck of said power hand tool and said connector; said at least one first connection block is provided at said connection member.

6. The transmission extension adapter as claimed in claim 5, wherein said connector comprises at least one retaining groove on a periphery thereof; said cylindrical cap shell comprises at least one locking block pivotally coupled to said connection member and adapted for engaging said at least one retaining groove.

7. The transmission extension adapter as claimed in claim 1, further comprising a hollow handle having a first end connected to said cylindrical cap shell and a second end covered with an openable end cap.

8. The transmission extension adapter as claimed in claim 1, further comprising a guard mounted on said axle sleeve.

9. The transmission extension adapter as claimed in claim 1, wherein each said suspension arm has a bearing portion for contact with the pressure members of said collar.

10. The transmission extension adapter as claimed in claim 1, further comprising a bearing mounted in said cylindrical cap shell to support said axle sleeve.

11. The transmission extension adapter as claimed in claim 1, wherein said cylindrical cap shell comprises an annular groove; said axle sleeve comprises at least one locating member provided at the periphery thereof and received in said annular groove to prohibit axial movement of said axle sleeve.

12. The transmission extension adapter as claimed in claim 11, wherein said collar comprises two notches on one end thereof; the periphery of said cylindrical cap shell includes a spring strip which is selectively engaged into one of said two notches to cause a clicking sound subject to rotation of said collar.

13. The transmission extension adapter as claimed in claim 12, wherein said pressure members of said collar respectively press on said suspension arms when said spring strip is forced into one said notch.

14. The transmission extension adapter as claimed in claim 12, wherein said spring strip has a middle protruding portion adapted for selectively engaging into one of said two notches of said collar.

15. The transmission extension adapter as claimed in claim 1, wherein said transmission axle has a coupling hole for the connection of a connection rod secured by said chuck of said power hand tool.

16. The transmission extension adapter as claimed in claim 1, further comprising a plurality of bearings mounted in said axle sleeve to support said transmission axle.

17. The transmission extension adapter as claimed in claim 1, wherein said front cap assembly comprises at least one second connection structure formed on a periphery thereof for the mounting of an automatic feeder.

* * * * *